United States Patent Office 3,542,811
Patented Nov. 24, 1970

1

3,542,811
6-HALO-6-DEHYDRO-A-NORPROGESTERONES
Patrick A. Diassi, Westfield, N.J., assignor to E. R. Squibb & Sons, Inc., New York, N.Y., a corporation of Delaware
No Drawing. Continuation-in-part of application Ser. No. 370,113, May 25, 1964. This application Oct. 19, 1967, Ser. No. 676,628
Int. Cl. C07d 21/00
U.S. Cl. 260—340.5                              5 Claims

ABSTRACT OF THE DISCLOSURE

This invention relates to 6-halo-6-dehydro-A-norprogesterones. These compounds are physiologically active materials, possessing progestatioanl activity. In addition, these compounds are useful as sun-screening, anti-oxidant and anti-corrosive agents. They are also surfactants, and thus may be employed as emulsifiers and wetting agents.

This application is a continuation-in-part of application Ser. No. 370,113, filed May 25, 1964, now abandoned.

This invention relates to and has as its objects the provision of new physiologically active steroids, processes for their production and novel intermediates useful in the preparation thereof.

More particularly, this invention relates to the provision of steroids of the formula

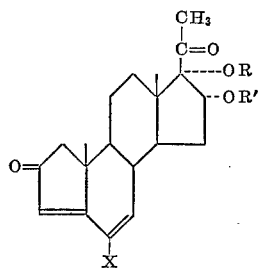

wherein X is hydrogen or halo (e.g., chloro, bromo or fluoro); R and R' are each hydrogen; and together R and R' is

wherein P is hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is monocyclic cycloalkyl or monocyclic heterocyclic.

The term "lower alkyl," as employed herein, includes both straight and branched chain radicals of less than eight carbon atoms. All four halogens are contemplated.

The term "monocyclic aryl radicals" contemplates monocyclic carbocyclic aryl radicals, for instance, phenyl and substituted phenyl radicals such as lower alkylphenyl, e.g., o-, m-, or p-tolyl-ethylphenyl; di-lower alkylphenyl, e.g., p-xylyl; lower alkoxyphenyl, e.g., methoxyphenyl; halophenyl, e.g., chlorophenyl, bromophenyl, etc.

The term "monocyclic cycloalkyl" includes cycloalkyl radicals containing from 3 to 6 ring members (e.g., cyclopropyl, cyclobutyl, cyclopentyl and cyclohexyl).

The term "monocyclic heterocyclic" includes heterocyclic radicals containing 5 or 6 ring members (e.g., furyl, thienyl, thiophenyl, thenyl, furfuryl, pyridyl, piperidinyl, morpholinyl, and the like).

The final products of this invention are physiologically active substances which possess progestational activity both orally and parenterally. As such they may be employed in the veterinary field for treating conditions in both large and small animals (e.g., dogs, cats, sheep, cows, horses and the like) which require a progestational agent. For instance, in animal breeding, the compounds of this invention are useful in preventing threatened abortion and may be administered for this purpose in dosages of about 2 to about 100 mg./kg. of body weight daily. In addition, control of milk and egg production may be achieved by regulation of the cycles of cows and chickens through the administration of the compounds of this invention in daily dosages, also of about 2 to about 100 mg./kg. of body weight.

Perorally acceptable formulations can be prepared in the usual manner to provide an aqueous suspension, an elixir or a solid dosage unit form (e.g., tablet, powder or capsule), for example, two-piece hard gelatin capsules may be filled with a mixture of the active ingredient and excipients (e.g., starch, talc, stearic acid, and/or magnesium stearate). Also one piece gelatin capsules containing the same amount of medicament may be prepared using sufficient corn oil or other suitable vegetable oil, to render the compound capsulatable. Tablets may be prepared by using starch, lactose of other conventional excipients, and may be scored to enable the administration of fractional dosages, if desired. Any of the tableting material used in pharmaceutical practice may be employed. Liquid preparations may be in the form of suspensions, emulsions, syrups or elixirs of the active substance in water or other liquid medium commonly used for making orally acceptable pharmaceutical formulations, such as liquid paraffin, or a syrup elixir base.

The active substance may also be made up in a form suitable for parenteral administration, i.e., as a suspension in sterile water or an organic liquid usually employed for injectionable preparations, for example a vegetable oil such as olive oil, or a sterile solution in an organic solvent.

In addition, the compounds of this invention are surface active agents which may therefore be employed in a variety of applications requiring such an agent. For example, the compounds of this invention may be employed as emulsifying agents in the preparation of lubricants, adhesives, polishes, wax compositions, and the like. Further, these compounds are ultraviolet-absorbing materials and may be employed as sun-screening agents. They may also be employed as antioxidants and corrosion inhibitors for various hydrocarbons and mixtures thereof. As examples of materials to which the compounds of this invention may be added for this purpose may be mentioned gasoline, hydrocarbon lubrication oils and greases, hydrocarbon solvents (e.g., toluene, kerosene) and the like.

The final products of this invention may be prepared according to processes of this invention, beginning with compounds of the formula

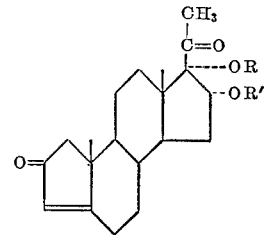

wherein R and R' are as defined hereinbefore and can be taken together to form

wherein P and Q are as hereinbefore defined, as starting material. These starting materials utilizable in this invention may be prepared according to the procedures and teachings set forth in U.S. Pat. No. 3,225,064, the disclosure of which also provides additional exemplification of the terms "P" and "Q."

The starting materials are first dehydrogenated as by treatment with a dehydrogenating agent such as 2,3-dichloro-5,6-dicyanobenzoquinone in a mineral acid, e.g., hydrogen chloride medium to yield the 6-dehydro derivatives of the starting materials.

The 6-dehydro derivatives are then oxidized as by treatment with a perbenzoic acid, for example, m-chloroperbenzoic acid to yield the 6α,7α-oxido derivatives thereof.

The 6α,7α-oxido compounds may then be reacted with an excess of a hydrohalide (e.g., hydrogen chloride or hydrogen bromide) at room temperature to yield the 6-halo-6-dehydro new final products of this invention.

Alternatively, the 6α,7α-oxido compounds may first be treated with 1 molar equivalent of a hydrohalide, such as hydrogen chloride, under reduced temperatures, to yield the 6-halo-7-hydroxy derivatives of this invention, which are also new compounds thereof.

These 6-halo-7-hydroxy derivatives may then be treated with an excess of hydrohalide, e.g., hydrogen chloride, at an elevated temperature to yield the 6-halo-6-dehydro final products of this invention.

If a ketal or acetal group other than that present in the starting material or final product or intermediates therefor is desired, the respective compound may be cleaved by treatment with aqueous formic acid to yield the respective free 16α,17α-dihydroxy compounds. These free diols may then be reacted with an aldehyde or ketone of the formula

wherein P and Q are as hereinbefore defined, in order to yield the desired 16,17-acetal or ketal derivatives. The reaction is preferably carried out by treating a suspension or solution of the 16,17-dihydroxy steroid in the aldehyde or ketone, with an acid catalyst, for example, perchloric acid, neutralizing the acid and recovering the acetal or ketal derivatives formed. Suitable aldehyde and ketone reactants include those set forth in U.S. Pat. 3,077,471, issued Feb. 12, 1963.

The invention may be further illustrated by the following examples:

EXAMPLE 1

6-dehydro-16α,17α-dimethylmethylenedioxy-A-norprogesterone

To a solution of 2.0 g. of 16α,17α-dimethylmethylenedioxy-A-norprogesterone in 100 ml. of purified dioxane, 1.25 g. of 2,3-dichloro-5,6-dicyanobenzoquinone are added and hydrogen chloride gas is bubbled through the resulting solution for five minutes. The mixture is then stirred at room temperature for 18 hours during which time 2,3-dichloro-5,6-dicyanohydroquinone precipitates. The mixture is filtered, washed with benzene and the combined filtrate and washings evaporated to dryness, in vacuo. The residue is redissolved in a small volume of benzene and adsorbed onto Woelm neutral alumina (Activity I). Elution with chloroform and evaporation of the solvent gives 1.8 g. of residue which is redissolved in 40 ml. of collidine and refluxed for one hour. After cooling the mixture is diluted with chloroform and washed successively with 2 N hydrochloric acid, 5% NaHCO$_3$, and water until neutral and then evaporated to dryness, in vacuo. The residue is redissolved in benzene and plate chromatographed using Woelm neutral alumina (Activity V) as adsorbant and benzene as the developing solvent. Detection of the band at Rf 0.5 by U.V. and elution with ethyl acetate gives material on evaporation of the solvent, in vacuo, which could be crystallized from acetone-hexane yielding 1.2 g. of 6-dehydro-16α,17α-dimethylmethylenedioxy - A - norprogesterone having a melting point of about 213–215°, $[\alpha]_D^{22}+36°$ (chloroform), $$\lambda_{max}^{alc} \; 276 \; m\mu \; (\epsilon = 22,500)$$

Analysis.—Calcd. for C$_{23}$H$_{30}$O$_4$ (370.47) (percent): C, 74.56; H, 8.16. Found (percent): C, 74.64; H, 8.10.

EXAMPLE 2

6-dehydro-16α,17α-(β-methyl-α-phenylmethylenedioxy)-A-nor-progesterone

Following the procedure of Example 1 but substituting 16α,17α-(β-methyl-α-phenylmethylenedioxy) - A - norprogesterone for the 16α,17α - dimethylmethylenedioxy-A-norprogesterone there is obtained 6-dehydro-16α,17α-(β-methyl - α - phenylmethylenedioxy)-A-norprogesterone.

EXAMPLE 3

6α,7α-oxido-16α,17α-dimethylmethylenedioxy-A-norprogesterone

A solution of 1.0 g. of 6-dehydro-16α,17α-dimethylmethylenedioxy-A-norprogesterone in 125 ml. of methylenechloride is cooled to 0° and 2.25 g. of metachloroperbenzoic acid are added slowly with stirring. The reaction is kept at 0° C. for ½ hour and then at room temperature for 16 hours. It is then washed successively with 100 ml. portions of 5% sodium bicarbonate, 5% sodium sulfite and water until neutral, dried over sodium sulfate and evaporated to dryness, in vacuo. Crystallization of the residue from acetone-hexane gives 830 mg. of 6α,7α-oxido - 16α,17α - dimethylmethylenedioxy - A-nor-progesterone having a melting point of 240–242° C.

EXAMPLE 4

6α,7α-oxido-16α,17α-(β-methyl-α-phenylmethylenedioxy)-A-norprogesterone

Following the procedure of Example 3 but substituting 6-dehydro-16α,17α - (β-methyl - α - phenylmethylenedioxy)-A-norprogesterone for the 6-dehydro - 16α,17α-dimethylmethylenedioxy - A-norprogesterone there is obtained 6α,7α-oxido-16α,17α - (β - methyl-α-phenylmethylenedioxy)-A-norprogesterone.

EXAMPLE 5

6β-chloro-7α-hydroxy-16α,17α-dimethylmethylenedioxy)-A-norprogesterone

To a cold solution of 193 mg. of 6α,7α-oxido-16α,17α-dimethylmethylenedioxy - A - norprogesterone in 10 ml. of chloroform is added 1.0 ml. of a solution containing 20 mg. of hydrogen chloride per ml. of chloroform. The solution is kept in an ice bath for 2½ hours and then diluted with water. The chloroform is separated, washed with water until neutral and then evaporated to dryness. The residue is crystallized from acetone-hexane to give 6β-chloro-7α - hydroxy - 16α,17α - dimethylmethylenedioxy-A-norprogesterone.

EXAMPLE 6

6β-chloro-7α-hydroxy-16α,17α-(β-methyl-α-phenylmethylenedioxy)-A-norprogesterone Following the procedure of Example 5 but substituting 6α,7α - oxido - 16α,17α - (β-methyl-α-phenylmethylenedioxy)-A-noprogesterone for the 6α,7α - oxido-16α, 17α- dimethylmethylenedioxy - A - norprogesterone there is obtained 6β-chloro-7α-hydroxy - 16α,17α-(β-methyl-α-phenylmethylenedioxy)-A-norprogesterone.

EXAMPLE 7

6β-bromo-7α-hydroxy - 16α,17α - dimethylmethylenedioxy-A-norprogesterone and 6β-bromo - 7α - hydroxy-16α,17α - (β - methyl-α-phenylmethylenedioxy)-A-norprogesterone Following the procedures of Examples 5 and 6 but substituting acetic acid for chloroform and hydrogen bromide in acetic acid for the hydrogen chloride in chloroform there are obtained 6β-bromo-7α-hydroxydimethylmethylenedioxy-A - norprogesterone and 6β-bromo-7α-hydroxy - 16α,17α - (β-methyl-α-phenylmethylenedioxy)-A-norprogesterone.

EXAMPLE 8

6-chloro-6-dehydro-16α,17α-dimethylmethylenedioxy-A-norprogesterone

A solution of 200 mg. 6α,7α-oxido-16α,17α-dimethylmethylenedioxy - A - norprogesterone in 10 ml. of chloroform is saturated at 0° C. with hydrogen chloride gas, then stoppered and kept at 45° C. for 20 hours. The solution is then diluted with chloroform washed successively with 5% sodium bicarbonate and then water, until neutral, and dried over sodium sulfate and evaporated to dryness. Plate chromatography of the residue using Woelm neutral alumina (Activity V) as adsorbant, and benzene as developing solvent gives a band at Rf 0.5 detectable by ultraviolet and eluted with ethyl acetate which on evaporation of the solvent and crystallization of the residue from acetone-hexane gives 6-chloro-6-dehydro - 16α,17α-dimethylmethylenedioxy - A - norprogesterone having a melting point of 191–193° C., $[\alpha]_D +13°$ (chloroform), $\lambda_{max}$ 278 mμ ($\epsilon$=21,400).

*Analysis.*—Calcd. for $C_{23}H_{29}O_4Cl$ (404.94)(percent): C, 68.21; H, 7.22; Cl, 8.75. Found (percent): C, 68.15; H, 7.15; Cl, 8.97.

EXAMPLE 9

6-chloro-6-dehydro-16α,17α-dimethylmethylenedioxy-A-norprogesterone

Following the procedure of Example 8 but substituting 6β - chloro - 7α - hydroxy - 16α,17α-dimethylmethylenedioxy-A-norprogesterone for the 6α,7α - oxido-16α,17α-dimethylmethylenedioxy-A-norprogesterone, there is obtained 6-chloro-6-dehydro-16α,17α - dimethylmethylenedoxy-A-norprogesterone.

EXAMPLE 10

6-chloro-6-dehydro-16α,17α-(β-methyl-α-phenylmethylenedioxy)-A-norprogesterone

Following the procedure of Example 8 but substituting 6α,7α-oxido - 16α,17α - (β - methyl-α-phenylmethylenedioxy)-A-norprogesterone for the 6α,7α-oxido-16α,17α-dimethylmethylenedioxy - A - norprogesterone or 6β-chloro - 7α - hydroxy - 16α,17α-(β-methyl-α-phenylmethylenedioxy)-A-norprogesterone for the 6β - chloro-7α-hydroxy - 16α,17α - dimethylmethylenedioxy-A-norprogesterone there is obtained 6-chloro-6-dehydro-16α,17α-(β - methyl-α-phenylmethylenedioxy) - A-norprogesterone.

EXAMPLE 11

6 - bromo - 6 - dehydro - 16α,17α - dimethylmethylenedioxy - A - norprogesterone and 6 - bromo - 6-dehydro-16α,17α - (β - methyl - α - phenylmethylenedioxy) - A norprogesterone Following the procedures of Examples 8 and 9 but substituting hydrogen bromide in acetic acid for the hydrogen chloride in chloroform there are obtained 6-bromo - 6 - dehydro-16α,17α-dimethylmethylenedioxy-A-norprogesterone and 6 - bromo - 6 - dehydro - 16α,17α-(β - methyl - α - phenylmethylenedioxy) - A - norprogesterone.

EXAMPLE 12

6-dehydro-16α,17α-dihydroxy-A-norprogesterone

A solution of 50 mg. of 6-dehydro-16α,17α-dimethylmethylene - dioxy - A - norprogesterone in 5 ml. of 60% formic acid is heated on a steam bath for forty minutes and then evaporated to dryness, in vacuo. The residue is then dissolved in 10 ml. of methanol and 3 ml. of 10% potassium carbonate and stirred at room temperature for ½ hour. It is then neutralized with dilute acetic acid, diluted with water and extracted with chloroform. The chloroform is washed with water and evaporated to dryness in vacuo. Crystallization of the residue gives 6-dehydro-16α,17α-dihydro-A-norprogesterone.

EXAMPLE 13

6 - chloro - 6 dehydro - 16α,17α - dihydroxy - A - norprogesterone and 6 - bromo - 6 - dehydro - 16α,17α-dihydroxy - A - norprogesterone Following the procedure of Example 12 but substituting 6 - chloro - 6 - dehydro - 16α,17α - dimethylmethylenedioxy - A - norprogesterone for the 6 - dehydro - 16α,17α - dimethylmethylenedioxy - A norprogesterone there is obtained 6 - chloro - 6 dehydro - 16α,17α - dihydroxy-A-norprogesterone.

Similarly, 6 - bromo - 6 - dehydro - 16α,17α - dihydroxy-A-norprogesterone is obtained by substituting the 6-bromo - 6 - dehydro - 16α,17α - dimethylmethylenedioxy-A-norprogesterone for the 6 - chloro - 6 - dehydro - 16α,17α - dimethylmethylenedioxy - A - norprogesterone.

EXAMPLE 14

6 - dehydro - 16α,17α - dimethylmethylenedioxy - A-norprogesterone

A solution of 50 mg. of 6-dehydro-16α,17α-dihydroxy-A-norprogesterone in 10 ml. of acetone containing 0.01 ml. of 70% perchloric acid is kept at room temperature for two hours. It is then neutralized with 5% sodium bicarbonate, diluted with water and extracted with chloroform. The chloroform is washed with water and evaporated to dryness, in vacuo. Crystallization of the residue from acetone-hexane gives 6-dihydro-16α,17α-dimethylmethylenedioxy-A-norprogesterone.

EXAMPLE 15

6 - chloro - 6 - dehydro - 16α,17α - dimethylmethylenedioxy - A - norprogesterone and 6 - bromo - 6 - dehydro-16α,17α - dimethylmethylenedioxy - A - norprogesterone Following the procedure of Example 14 but substituting 6 - bromo- or 6 - chloro - 6 - dehydro - 16α,17α - dihydroxy - A norprogesterone for the 6-dehydro-16α,17α-dihydroxy-A-norprogesterone, there is obtained respectively 6 - bromo - 6 - dehydro - 16α,17α - dimethylmethylenedioxy - A - norprogesterone and 6 - chloro - 6 - dehydro - 16α,17α - dimethylmethylenedioxy - A - norprogesterone.

What is claimed is:
1. A compound having the formula

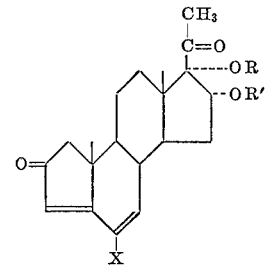

wherein X is halo, and R and R' taken together is

wherein P is selected from the group consisting of hydrogen, lower alkyl, halo lower alkyl, monocyclic cycloalkyl, monocyclic cycloalkyl-lower alkyl, monocyclic aryl, monocyclic aryl-lower alkyl; Q is selected from the group consisting of lower alkyl, halo lower alkyl, monocyclic cycloalkyl, monocyclic cycloalkyl-lower alkyl, monocyclic aryl, monocyclic aryl-lower alkyl; and P and Q, taken together with the carbon to which they are joined, is monocyclic cycloalkyl, wherein lower alkyl contains less than eight carbon atoms, monocyclic cycloalkyl contains from 3 to 6 ring members and the monocyclic aryl radicals is selected from the group consisting of phenyl, lower alkyl phenyl, di-lower alkyl phenyl, lower alkoxy phenyl and halophenyl.

2. A compound in accordance with claim 1 having the name 6-chloro - 6 - dehydro-16α,17α-dimethylmethylenedioxy-A-norprogesterone.

3. A compound in accordance with claim 1 having the name 6 - chloro - 6 - dehydro - 16α,17α - (β - methyl - α-phenyl - methylenedioxy) - A - norprogesterone.

4. A compound in accordance with claim 1 having the name 6-bromo-6-dehydro - 16α,17α - dimethylmethylenedioxy-A-norprogesterone.

5. A compound in accordance with claim 1 having the name 6 - bromo - 6 - dehydro - 16α,17α - (β - methyl-α-phenylmethylenedioxy) - A - norprogesterone.

References Cited
UNITED STATES PATENTS 3,213,142  10/1965  Weisenborn _____ 260—586
3,225,064  12/1965  Weisenborn _____ 260—304.5

ALEX MAZEL, Primary Examiner

J. H. TURNIPSEED, Assistant Examiner

U.S. Cl. X.R.

252—394, 395, 396, 405, 406, 407; 260—247.7, 294.7, 297, 326.5, 327, 332.3, 586; 424—59, 248, 263, 267, 275, 278